United States Patent

Chen et al.

[11] Patent Number: 5,652,665
[45] Date of Patent: Jul. 29, 1997

[54] TRANSPARENCY ADAPTER FOR FLATBED SCANNERS

[75] Inventors: Daniel Chen; Alpha Tasy; Kevin Chen, all of Hsinchu, Taiwan

[73] Assignee: UMAX Data System Inc., Hsinchu, Taiwan

[21] Appl. No.: 525,019

[22] Filed: Sep. 8, 1995

[51] Int. Cl.$^6$ .............. H04N 1/04; G03B 27/54; G01J 1/00; F21S 3/00

[52] U.S. Cl. .......... 358/487; 358/475; 358/474; 250/228; 355/67; 362/217

[58] Field of Search .............. 358/474, 482, 358/483, 487, 475, 485, 494, 505, 497; 362/307, 308, 223, 326, 328, 217; 250/228; 355/67; 356/236

[56] References Cited

U.S. PATENT DOCUMENTS 4,422,100  12/1983  DuVall et al. ................ 358/497
5,164,844  11/1992  Granger ........................ 250/228
5,453,849  9/1995   Copenhaver et al. ........ 358/475

Primary Examiner—Edward L. Coles, Sr.
Assistant Examiner—Kimberly A. Williams
Attorney, Agent, or Firm—Bacon & Thomas

[57] ABSTRACT

A transparent adapter hinged to a flatbed scanner for the scanning of a transparency or negative, including a hot cathode-ray tube to provide light, a refractor mounted around the hot cathode-ray tube to refract light from the hot cathode-ray tube onto a document, for permitting the image of the document to be picked up by a charge-coupled device in the optical scanner, and to prevent light from being directly projected by the hot cathode-ray tube onto the document.

4 Claims, 3 Drawing Sheets

TRANSPARENCY ADAPTER FOR FLATBED SCANNERS

BACKGROUND OF THE INVENTION

The present invention relates to a transparency adapter for flatbed scanners, and relates more particularly to such a transparency adapter which eliminates the interference of shadows of black spots on the bottom side of the hot cathode-ray tube by using a refractor to refract light from the hot cathode-ray tube onto the document to be scanned and to prevent light from being directly projected by the hot cathode-ray tube onto the document.

When a flatbed scanner is used to scan a transparency or negative, a transparency adapter must be used. The transparency adapter has a hot cathode-ray tube, which projects light onto the document to be scanned so that the image of the document can be picked up by the CCD (charge-coupled device) of the flatbed scanner. However, because mercury steam will be condensed and deep-seated at the bottom, black spots will appear in the bottom side of the hot cathode-ray tube. When these black spots appear, the scanning quality will be affected, and the hot cathode-ray tube should be replaced.

SUMMARY OF THE INVENTION

The present invention has been accomplished to provide a transparency adapter which eliminates the aforesaid problem. According to one aspect of the present invention, a refractor is provided and mounted around the hot cathode-ray tube to refract light from the hot cathode-ray tube onto the document to be scanned and to prevent light from being directly projected from the hot cathode-ray tube onto the document, and therefore the interference of shadows of black spots on the bottom side of the hot cathode-ray tube is eliminated. According to another aspect of the present invention, the refractor is made of oval shape having a first conjugate point in which the hot cathode-ray tube is mounted, and a second conjugate point; a refracting plate is mounted between the hot cathode-ray tube and the second conjugate point and having a refracting surface disposed in 45° angle of inclination for refracting light vertically downwards onto the document. According to still another aspect of the present invention, the distance between the first conjugate point (the hot cathode-ray tube) and the second conjugate point is equal to the distance between the document and the refracting point on the refracting surface of the refracting plate plus the distance between the hot cathode-ray tube and the refracting point.

DETAILED DESCRIPTION OF THE PREFERRED EMBODIMENT

Figure 1:
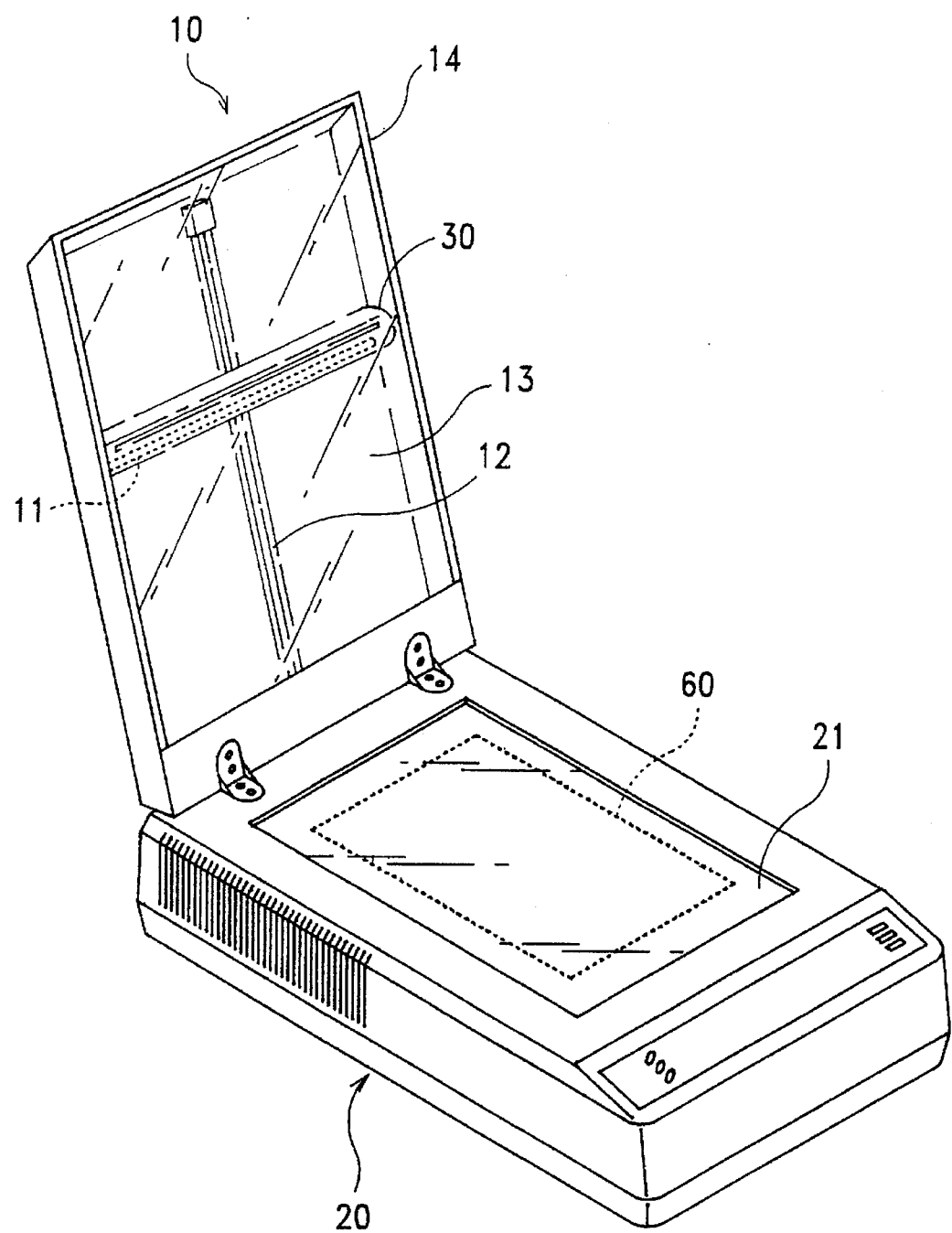
FIG. 1 is a perspective view showing a transparency adapter hinged to a flatbed scanner according to the present invention.

The transparency adapter, referenced by 10 is hinged to a flatbed scanner 20 at the top for the scanning of a transparency or negative. The transparency adapter 10 comprises a shell 14, a flat transparent cover board 13 covered on the shell 14 at an inner side, a driving mechanism 12 mounted inside the shell 14, a hot cathode-ray tube 11 mounted inside the shell 14 and reciprocated by the driving mechanism 12, and a refractor 30 covered around the hot cathode-ray tube 11. The flatbed scanner 20 has a flat top scanning surface 21 on which the document to be scanned 60 is placed for scanning. When the transparency adapter 10 is closed on the flatbed scanner 20, the transparent cover board 13 is closely attached to the flat top scanning surface 21 to hold the document 60, and the hot cathode-ray tube 11 provides the necessary light source to the CCD (charge-coupled device) of the flatbed scanner 20 for scanning the image of the document 60. The refractor 30 refracts light rays from the hot cathode-ray tube 11 onto the CCD of the optical scanner 20. Therefore, light rays from the hot cathode-ray tube 11 are not perpendicularly projected onto the CCD of the optical scanner 20.

Figure 2:
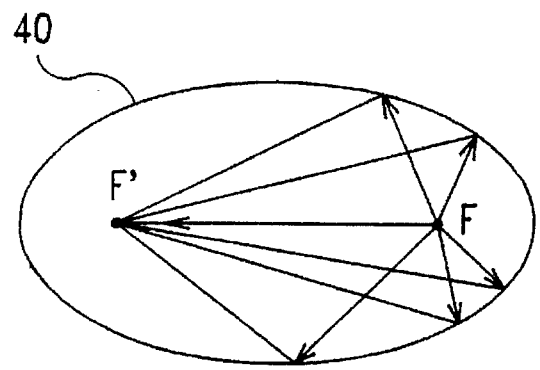
FIG. 2 is a schematic drawing showing the oval conjugate characteristic.
Figure 3:
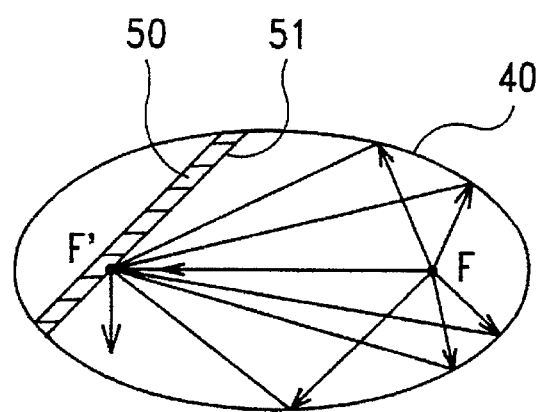
FIG. 3 is similar to FIG. 2 but showing light at the second conjugated point refracted vertically downwards.

The concept of the present invention is derived from oval conjugate characteristics. As illustrated in FIG. 2, the oval 40 has two conjugate points, namely, the first conjugate point F and the second conjugate point F'. Assume the surface of the oval 40 is reflective, therefore light rays will be directly projected or refracted onto the second conjugate point F' if the light source is set at the first conjugate point F. As illustrated in FIG. 3, the refracting surface 51 of the refracting plate 50 is disposed in 45° angle of inclination facing the first conjugate point F to refract light rays vertically downwards.

Figure 4:
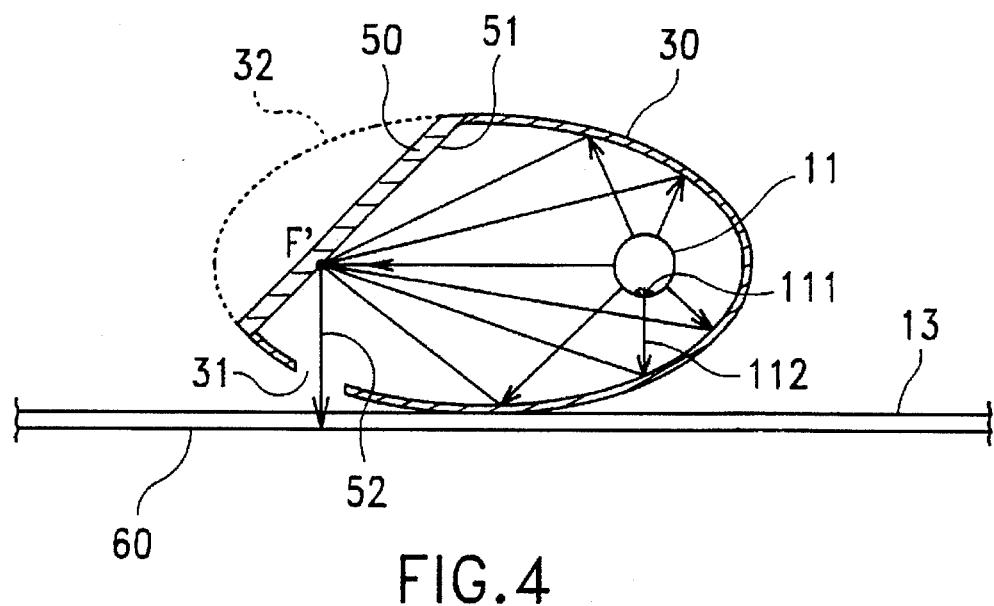
FIG. 4 is a schematic drawing showing the preliminary application of the present invention.

FIG. 4 is a schematic drawing showing the premilinary application of the present invention, in which the hot cathode-ray tube 11 is equal to the first conjugate point F shown in FIG. 3; the refractor 30 is made of oval shape and disposed adjacent to the hot cathode-ray tube 11; the refracting plate 50 is mounted on the second conjugate point F' with its refracting surface 51 disposed in 45° angle of inclination facing the hot cathode-ray tube 11 to refract light rays vertically downwards. The inside wall of the refracting surface 51 of the refracting plate 50 and the inside wall of the refractor 30 are respectively made from opaque material, so that light can be completely refracted by the refracting surface 51 and the refractor 30. The refractor 30 has an opening 31 for permitting refracted light 52 to pass from the refracting surface 51 through the transparent cover board 13 to the document 60. The back structure 32 of the refractor 30 (see the dotted line) at the back side of the refracting plate 50 may be omitted to reduce the weight and to save the material. When the hot cathode-ray tube 11 and the refractor 30 are reciprocated by the driving mechanism 12 within the shell 14 (see also FIG. 1) over the document 60, light from the hot cathode-ray tube 11 is refracted by the inside wall of the refractor 30 and the refracting plate 50 onto the second conjugated point F', and then refracted by the refracting surface 51 of the refracting plate 50 from the second conjugated point F' through the opening 31 and the transparent cover board 13 onto the document 60. Because of mercury steam, black spots 111 may deposit at the bottom side of the hot cathode-ray tube 11. However, because light rays 112 which pass through the black spots 111 are not directly projected onto the document 60 but refracted by the refractor 30 onto the second conjugate point F' and then refracted onto the document 60 by the refracting surface 51 of the refracting plate 50, the shadows of the black spots 111 are weakened, therefore no black lines exist in the image picked up from the document 60.

Figure 5:
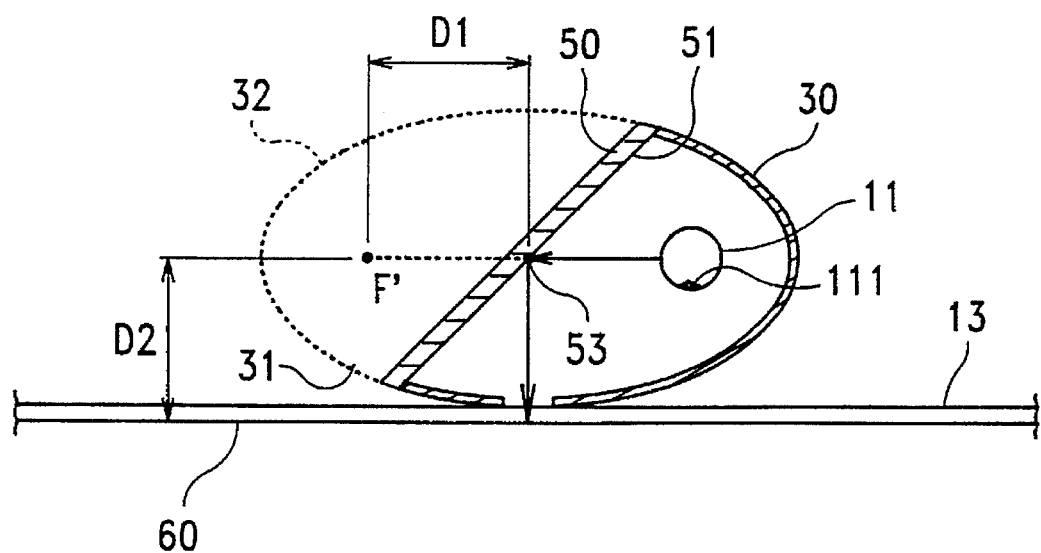
FIG. 5 is similar to FIG. 4 but showing the position of the refractor moved closer to the hot cathode-ray tube.

FIG. 5 shows an alternate arrangement of the present invention. In this alternate arrangement, the refracting plate 50 is disposed closer to the hot cathode-ray tube 11 without changing its angle of inclination. Light from the cathode-ray tube 11 is refracted at a refracting point 53 on the refracting surface 51 of the refracting plate 50 vertically downwards toward the document 60. The distance D1 between the second conjugate point F' and the refracting point 53 is equal to the distance D2 between the refracting point 53 and the document 60. In FIG. 4, the refracting surface 51 of the refracting plate 50 is disposed in the second conjugate point F' far from the hot cathode-ray tube 11, therefore the intensity of light will be attenuated. This problem is eliminated by the arrangement shown in FIG. 5.

It is to be understood that the drawings are designed for purposes of illustration only, and are not intended as a definition of the limits and scope of the invention disclosed.

We claim:

1. A transparent adapter hinged to a flatbed scanner for scanning a transparency of negative, comprising a hot cathode-ray tube to provide light, an oval shaped refractor mounted around said hot cathode-ray tube to refract light from said hot cathode-ray tube onto a document, for permitting the image of said document to be picked up by a charge-coupled device in said flatbed scanner, and to prevent light from being directly projected from said hot cathode-ray tube on to said document, said oval shaped refractor having a first conjugate point in which said hot cathode-ray tube is mounted, and a second conjugate point, said adapter further comprising a refracting plate mounted on said refractor within the area between said hot cathode-ray tube and said second conjugate point, said refracting plate having a refracting surface disposed at a 45° angle of inclination for refracting light from said cathode-ray tube onto said document.

2. The transparent adapter of claim 1 wherein said refracting surface of said refracting plate and said refractor have a respective inside wall made of opaque material.

3. The transparent adapter of claim 1 wherein the distance between said first conjugate point and said second conjugate point is equal to the distance between said document and the refracting point at which light is refracted by said refracting surface of said refractor onto said document, plus the distance between said hot cathode-ray tube and said refracting point.

4. The transparent adapter of claim 1 wherein said refractor has an opening through which light is refracted by said refracting surface of said refracting plate onto said document.

* * * * *